US008904061B1

(12) United States Patent
O'Brien, III et al.

(10) Patent No.: US 8,904,061 B1
(45) Date of Patent: Dec. 2, 2014

(54) MANAGING STORAGE OPERATIONS IN A SERVER CACHE

(75) Inventors: Walter A. O'Brien, III, Westborough, MA (US); Thomas E. Linnell, Northborough, MA (US); Roy E. Clark, Hopkinton, MA (US); John S. Harwood, Paxton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/341,193

(22) Filed: Dec. 30, 2011

(51) Int. Cl.
*G06F 13/00* (2006.01)
*G06F 12/08* (2006.01)

(52) U.S. Cl.
CPC .................. *G06F 12/0866* (2013.01)
USPC ........................................... 710/39; 711/113

(58) Field of Classification Search
CPC .................................................. G06F 12/0866

USPC ........................................... 709/219; 711/113
See application file for complete search history.

(56) References Cited

U.S. PATENT DOCUMENTS

| 7,330,880 | B1 * | 2/2008 | English ......................... 709/219 |
| 7,752,325 | B1 * | 7/2010 | Yadav et al. .................. 709/231 |
| 2011/0271010 | A1 * | 11/2011 | Kenchammana et al. .... 709/244 |

* cited by examiner

*Primary Examiner* — Ernest Unelus
(74) *Attorney, Agent, or Firm* — Krishnendu Gupta; Jason A. Reyes; John T. Hurley

(57) ABSTRACT

A method is used in managing storage operations in a data storage environment. An I/O request is received a server having a server cache where the server cache contains cached data previously supplied from a storage system in communication with the server. At the storage system, determine if the I/O request can be at least partially satisfied from the cached data.

20 Claims, 4 Drawing Sheets

MANAGING STORAGE OPERATIONS IN A SERVER CACHE

BACKGROUND

1. Technical Field

This application relates to managing storage operations in a server cache.

2. Description of Related Art

Storing and safeguarding electronic data is of paramount importance in modern business. Accordingly, various systems may be employed to protect such electronic data.

Storage devices are employed to store data that is accessed by computer systems. Examples of basic storage devices include volatile and non-volatile memory, floppy drives, hard disk drives, tape drives, optical drives, etc. A storage device may be locally attached to an input/output channel of a computer. For example, a hard disk drive may be connected to a computer's disk controller.

As is known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

The use of solid-state storage devices is increasing in popularity. A solid state storage device is a data storage device that uses solid-state memory to store persistent data. A solid-state storage device may emulate (and therefore replace) a conventional hard disk drive. Alternatively, or in addition, a solid state storage device may be used within a cache memory system. With no moving parts, a solid-state storage device largely eliminates (or greatly reduces) seek time, latency and other electromechanical delays and failures associated with a conventional hard disk drive.

A storage device may also be accessible over a network. Examples of such a storage device include network attached storage (NAS) and storage area network (SAN) devices. A storage device may be a single stand-alone component or be comprised of a system of storage devices such as in the case of Redundant Array of Inexpensive Disks (RAID) groups.

Storage elements in a SAN may be physical disks assembled into data storage system (herein also referred to as a "disk storage array", "disk array", "storage array" or simply "array") and may be configured to distribute data across multiple storage devices. A data storage system (DSS) may further be equipped with a persistent cache, which can treat a write operation as being completed when the data associated with the write operation (intended to be written to the DSS) has been written to the cache. The persistent cache may then independently flush the write operation to the DSS. By reducing the latency of the write operation at the DSS, the persistent cache may provide for increased overall performance (i.e., data throughput).

Caches may additionally be installed at multiple points in the storage environment between an application issuing input/output (I/O) operations and the target physical storage arrays. For example, a server/host (server and host may be used interchangeably herein) that includes application(s) issuing read/write commands may also include a server/host cache that can be configured to cache corresponding data.

SUMMARY OF THE INVENTION

A method is used in managing storage operations in a data storage environment. An I/O request is received a server having a server cache where the server cache contains cached data previously supplied from a storage system in communication with the server. At the storage system, determine if the I/O request can be at least partially satisfied from the cached data.

BRIEF DESCRIPTION OF THE DRAWINGS

Features and advantages of the present invention will become more apparent from the following detailed description of example embodiments thereof taken in conjunction with the accompanying drawings in which.

DETAILED DESCRIPTION OF EMBODIMENT(S)

Figure 1:
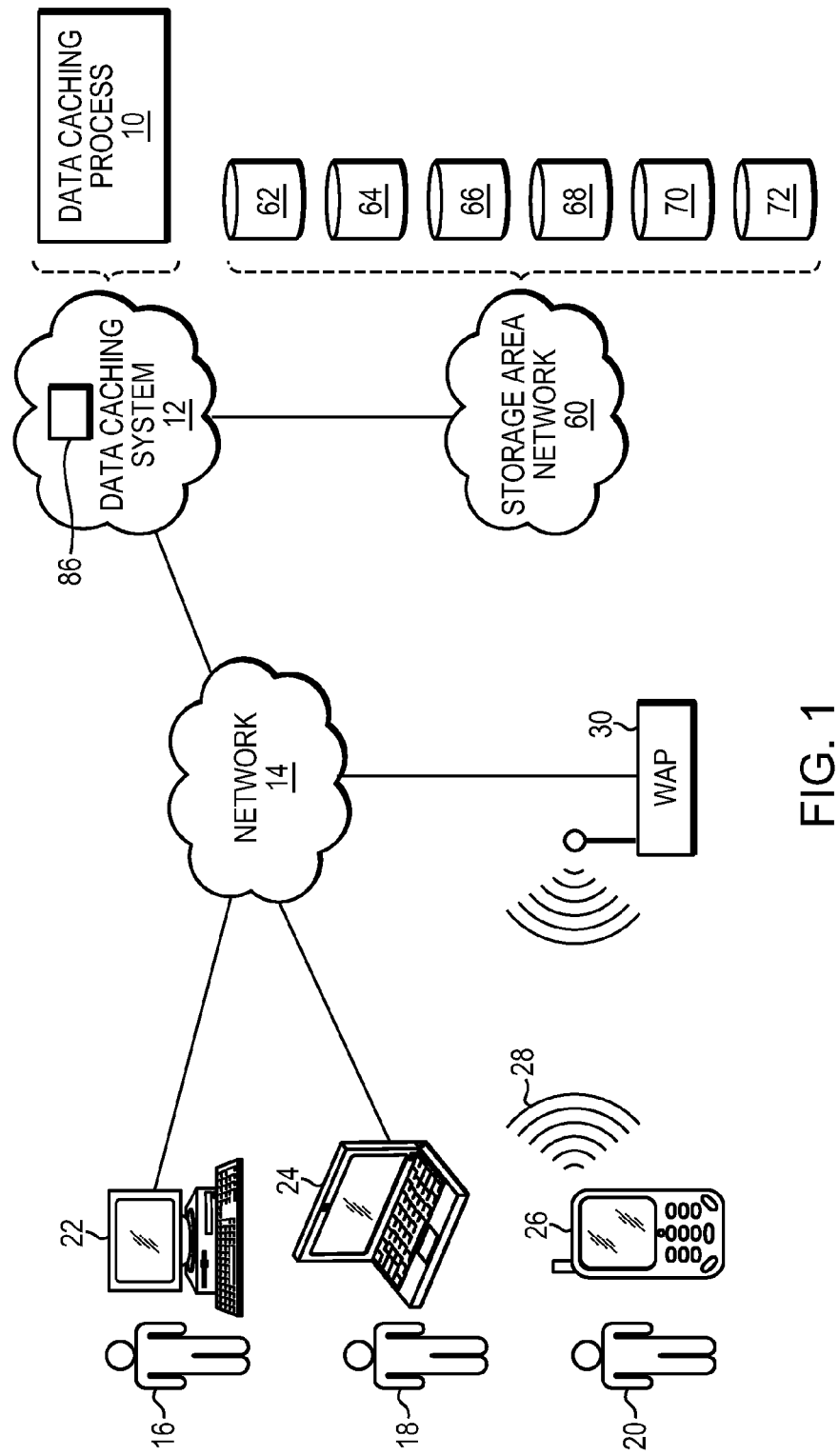
FIG. 1 is a block diagram illustrating an example embodiment of a system that may utilize the techniques described herein.

Described below are techniques for use in managing storage operations in a server cache, which techniques may be used, for example, for optimizing host/server cache (also referred to herein as "flash cache" and "server flash" unless indicated otherwise) used in conjunction with data storage systems that employ pointer-based replication technology. Data storage systems (DSS) have begun to implement space saving techniques in order to more efficiently utilize storage space. Examples include pointer-based replication technology such as, for example, snapshot replicas. For many applications, there may be a multiple identical storage objects wherein each copy may be stored at a logical block address (LBA) on a particular logical unit number (LUN). Rather than storing complete copies each of the multiple storage objects, pointer-based replica technology may store one complete copy of the original storage object and each additional storage object can contain a pointer to the original storage object.

Such techniques may be applied to any DSS storage resource including DRAM cache, solid state drive (SSD) cache, and hard disk drive (HDD) storage devices. Thus, a DSS employing pointer-based replication technology is aware that two logical blocks are the same if one logical block points to the contents of another logical block. It should be noted that the DSS does not need to be aware of the contents of the logical blocks, merely that a logical block contains a pointer to another logical block. Such pointer information may be maintained in, for example, the DSS.

For example, data stored in LUN_1:LBA123 may be stored as a complete copy of a storage object. Two snapshot replicas, LUN_2:LBA123 and LUN_3:LBA123, of the original storage object may be created wherein the contents of each storage object contains a pointer to LUN_1:LBA123. Thus, rather than storing three copies of the data, the DSS stores one complete copy and two pointers to the copy. When a host issues a read request to a DSS requesting LUN_3:LBA123, the array will return the contents of LUN_1:LBA123. Consequently, storage utilization is much more efficient, effectively enabling the DSS to store significantly more data. Given the cost/performance metrics, this method is also well-suited for use with DSS cache, such as SSDs employing FLASH device technology, for example.

However, in conventional systems, when a host issues a read request to a DSS for two storage objects that are the same (e.g., LUN_2:LBA123 and LUN_3:LBA123), the host does not know that the DSS has replicated the storage objects and will store two complete copies of what is identical data. By contrast, techniques described herein provide enhanced DSS-to-host communication such that the host may take advantage of the DSS pointer-based replication information to improve host caching performance and efficiency.

It should be noted that example embodiments of the techniques described herein use LUNs to describe various implementations. This should not be taken as a limitation and other data group sizes may similarly use the techniques described herein, such as but not limited to, file based storage using a network file system (NFS) protocol.

In brief, when the host issues a read or write request, additional information may be provided to inform the DSS that the host will store the requested data in (and/or evict data from) its cache. The DSS maintains pointer information so that it can determine that a block that contains a pointer to another block is the same as the pointed to block. When the host issues a read request for a block that points to a block already in the server cache, the DSS returns a read status to the host indicating where in the server cache the requested block can be read.

Alternatively, the DSS can decide what data the host should store (and/or which data the host should evict) from cache. Consequently, server cache storage efficiency is improved in that subsequent copies of logical blocks stored in server cache may be effectively stored as a pointer to a block already located in the server cache. DSS-to-host performance is improved because, in the event that the host requests data that the DSS can determine is already in the server cache, the DSS can quickly return a status indicating such, rather than copying and transmitting potentially large amounts of data.

There are situations where further performance improvements can be achieved such as when sequential read requests may request sequential contiguous storage objects (e.g., sequential LBAs). Techniques described herein may further improve array to host performance by returning an extent around the block being requested which is duplicated between the two LUNs. The server cache can optimize sequential access by checking the list of known duplicate extents before sending the read request to the array. If it is a known duplicate and the desired block in the other LUN is available in the server cache, then the block can be returned without communication with the array. This may also prevent subsequent cache misses where array would again tell the server flash cache to 'get from cache' thereby avoiding communication with array (i.e., the flash cache wouldn't have to ask the DSS for the object).

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
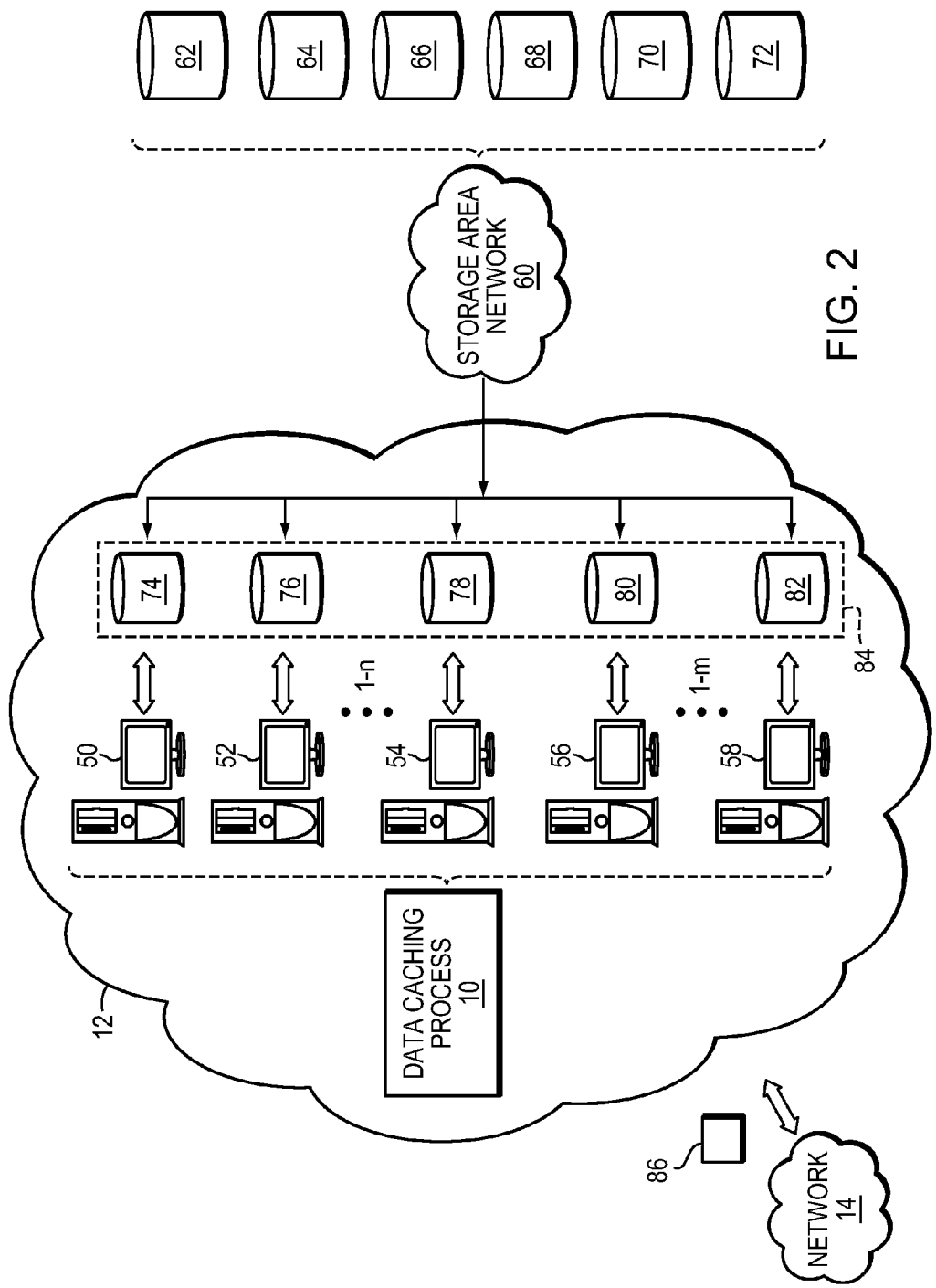
FIG. 2 is a block diagram illustrating an example embodiment of a storage environment that may utilize the techniques described herein.

Referring to FIGS. 1 & 2, there is shown data caching process 10 that may reside on and may be executed by data caching system 12, which may be connected to network 14 (e.g., the Internet or a local area network). Examples of data caching system 12 may include, but are not limited to, any combination of computing devices and storage devices. One exemplary embodiment includes five server computers 50, 52, 54, 56, 58, configured to work as a caching tier. Server computers 50, 52, 54, 56, 58 may be configured as discrete computing devices within data caching system 12.

Data caching system 12 may be coupled to a storage area network (e.g., storage area network 60) or any other form of persistent storage. Storage area network 60 may be coupled to one or more storage devices (e.g., storage devices 62, 64, 66, 68, 70, 72, which may be configured to act as persistent storage for data initially cached within server computers 50, 52, 54, 56, 58.

Each of server computers 50, 52, 54, 56, 58 may include a storage device (e.g., storage devices 74, 76, 78, 80, 82 respectively), examples of which may include but are not limited to solid-state memory devices, such as random access memory (RAM) devices and flash-based memory devices (e.g., a flash drive). These storage devices (e.g., storage devices 74, 76, 78, 80, 82) may form data storage system 84 (within data caching system 12) for temporarily caching data received for storage on storage area network 60. Storage devices 74, 76, 78, 80, 82 may be configured as N data storage devices. For illustrative purposes, assume that N is equal to three and storage devices 74, 76, 78 are configured as data storage devices.

One or more of the servers (e.g., server computers 50, 52, 54, 56, 58) included within data caching system 12 may be a web server (or a series of servers) running a network operating system, examples of which may include but are not limited to: Microsoft Windows XP® Server; Novell Netware® or Redhat Linux™, for example. Server computers 50, 52, 54, 56, 58 may execute a web server application, examples of which may include but are not limited to: IBM WebSphere®, Microsoft IIS™, Novell Webserver™, or Apache Webserver™, that allows for HTTP (i.e., HyperText Transfer Protocol) access to one or more of server computer 50, 52, 54, 56, 58 via network 14. Network 14 may be connected to one or more secondary networks (not shown), examples of which may include but are not limited to: a local area network; a wide area network; or an intranet, for example.

The instruction sets and subroutines of data caching process 10 may be stored on one or more storage devices included within data caching system 12. For example, the instruction sets and subroutines of data caching process 10 may be stored on one or more of: storage device 74 coupled to server computer 50; storage device 76 coupled to server computer 52; storage device 78 coupled to server computer 54; storage device 80 coupled to server computer 56; and storage device 82 coupled to server computer 58. Accordingly, the instruction sets and subroutines of data caching process 10 may be distributed amongst the various devices included within data caching system 12.

The instruction sets and subroutines of data caching process 10 may be executed by one or more processors (not shown) and one or more memory architectures (not shown) incorporated into one or more of: server computer 50; server computer 52; server computer 54; server computer 56; and server computer 58. Accordingly, execution of the instruction sets and subroutines of data caching process 10 may be distributed amongst the various devices included within data caching system 12.

Users 16, 18, 20 may store and/or retrieve various data portions (not shown) from the various devices (e.g., server computers 50, 52, 54, 56, 58) included within data caching system 12 using client electronic devices 22, 24, 26 (respectively). Examples of client electronic devices 22, 24, 26 may include, but are not limited to, personal computer 22, laptop computer 24, personal digital assistant 26, a server computer (not shown), a notebook computer (not shown), a data-enabled, cellular telephone (not shown), and a dedicated network device (not shown). Client electronic devices 22, 24, 26 may each execute an operating system, examples of which may include but are not limited to Microsoft Windows®, Microsoft Windows CE®, Redhat Linux™, or a custom operating system.

The various client electronic devices may be directly or indirectly coupled to network 14. For example, personal computer 22 and laptop computer 24 are shown directly coupled to network 14 via a hardwired network connection. Further, personal digital assistant 26 is shown wirelessly coupled to network 14 via wireless communication channel 28 established between personal digital assistant 26 and wireless access point (i.e., WAP) 30, which is shown directly coupled to network 14. WAP 30 may be, for example, an IEEE 802.11a, 802.11b, 802.11g, 802.11n, Wi-Fi, and/or Bluetooth device that is capable of establishing wireless communication channel 28 between personal digital assistant 26 and WAP 30.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 3:
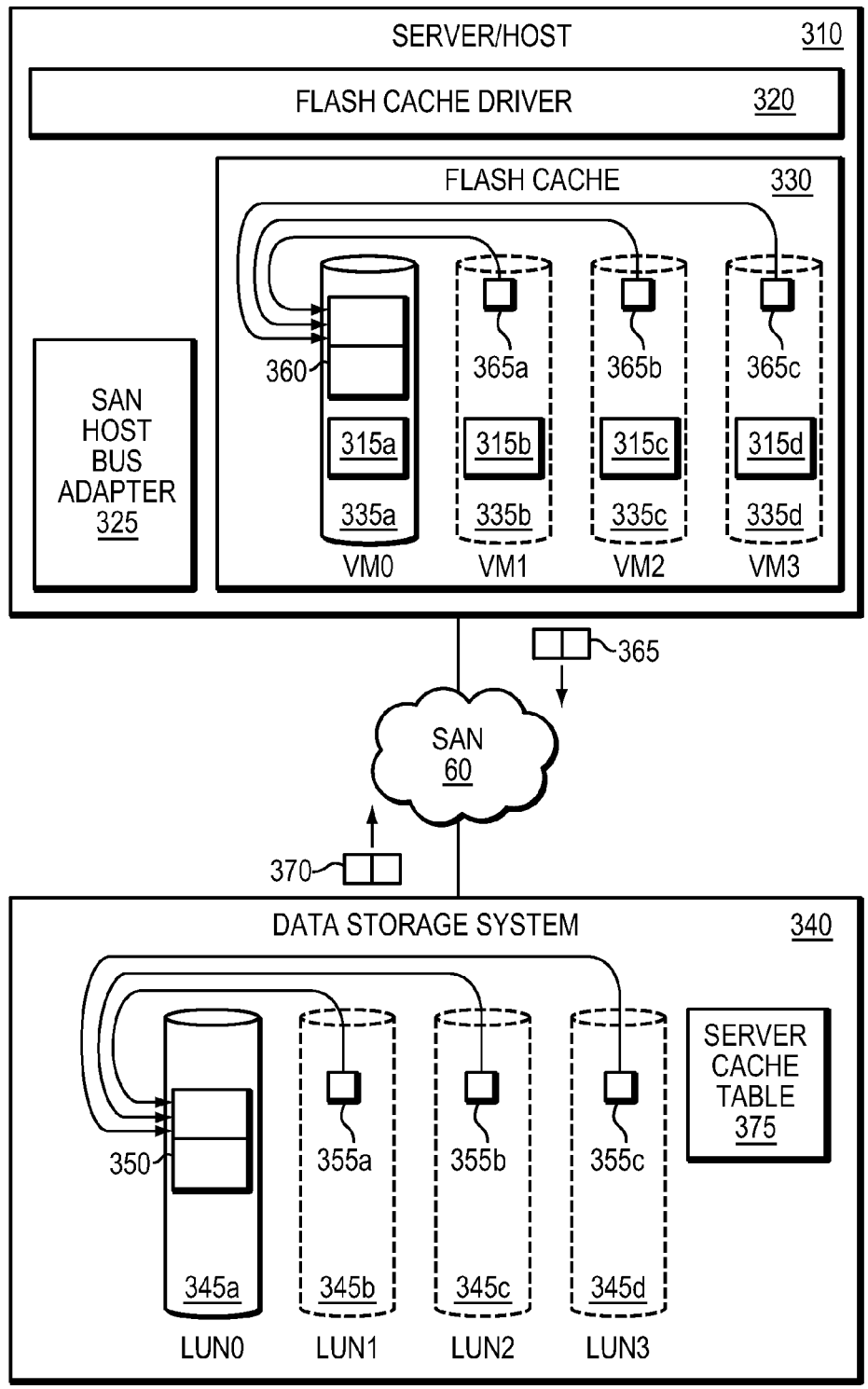
FIG. 3 is a block diagram illustrating in additional detail an example embodiment of a storage system that may utilize the techniques described herein.

Referring to FIG. 3, shown is a block diagram depicting example embodiments employing techniques described herein. As a vehicle for describing these techniques in more detail, example embodiments illustrate a virtual machine (VM) environment to describe enhanced data storage array 340 to server cache 330 communications for use in improving server cache utilization and performance. However, the discussion of VMs is for convenience sake only and techniques described herein should not be construed to being limited as such and may be used in other situations where multiple copies of identical data are communicated between a DSS and host/server cache.

In the example depicted, a method for providing data storage management in a virtualized environment may include providing a server 310 and a DSS 340 coupled together via a SAN 60. Although communication between a server 310 and a DSS 340 is used to describe the techniques described herein, this should not be construed as a limitation and other components may also be used in conjunction with the server 310 and DSS 340. For example, a caching device (not shown), such as a VPLEX® provided by EMC Corporation, Hopkinton, Mass., may be located between the server 310 and the DSS 340 or other such network configuration. The data storage environment may include other such devices as well.

Multiple VMs are implemented on the server, and corresponding flash cache 335a-d may be associated with each VM. For example, multiple desktop personal computer (PC) VMs may be provided wherein a software boot image is provided for each VM. In the DSS 340, a LUN 345a-d may be associated with each VM. Here, a master copy of the complete boot image 350 may be stored on LUN0. A boot disk for each VM may be essentially the same except for a few initial changes unique to each VM, such as hostname, IP address, etc. The DSS 340 may employ pointer-based replica technology to reduce the storage space required to store each VMs copy of its associated boot disk by taking a snapshot of the master copy boot image 350. Thus, identical blocks may be stored as pointers 355a-c in each VMs LUN 345b-d and any unique blocks are individually maintained as copies on respective LUNs 345b-d.

The server 310 may include one or more applications 315a-d, a flash cache driver 320, SAN host bus adapter 325, and a flash cache 330. Although the server cache is depicted as a flash cache, other cache technologies may be similarly utilized including, but not limited to, DRAM, hard disk drive(s), and the like. It should be noted that an application can be multiple instances of the application 315a-d running in corresponding VM0-3. For example, with the boot image example described above, a copy of the boot image (complete or replicated) may be contained in each VM0-3 (i.e., stored and executed in association with each VM). Thus, an application in VM0 would access one boot image 315a and an application in VM3 would access boot image 315d. The server 310 may be connected to a SAN 60, which in turn may be connected directly or indirectly to a storage array 340 in a manner similar to that as described above. As will be appreciated by those skilled in the art, the server 310 and DSS 340 may also include other components than as described for purposes of illustrating the techniques described herein.

In operation, the server 310 issues a read request for a storage object (e.g., via application 315a-d). The request is forwarded to the flash cache driver 320. In the case of a read hit, the flash cache driver 320 determines that the requested storage object is in the flash cache 330 and reads data associated with the storage object out of flash cache 330 and returns it to the requestor (e.g., application 315a-d).

In the case of a read miss, the flash cache driver 320 determines that the requested storage object is not in the flash cache 330. Since the data in not in the flash cache 330, the flash cache driver 320 forwards the read request 365 to the DSS 340 via, for example, the SAN host bus adapter 325. In one example embodiment, the flash cache driver 320 may also forward to the DSS 340 information 365 (e.g., a flag) indicating that the requested storage object will be stored in the server's flash cache 330 once received back from the DSS 340. The flash cache driver 320 may also include evict information should it determine that data will be evicted from flash cache 330. The DSS 340 may store and maintain this information in a server cache table 375.

The server cache table 375 may be built and maintained in the DSS 340 in conjunction with the flags associated with a read request 365 and may describe which data from a respective LUN is in server cache. For example, the table may include information to determine that: (LUN7, LBA__4-9), (LUN9, LBA__23-68), and (LUNG, LBA__17-19) are in the server cache. However, the actual contents are already in the server cache and so do not need to be stored in the server cache table 375. In addition, as described above, the DSS 340 also maintains pointer information and can determine that a storage object that points to another object is a copy of the pointed to object. Continuing with the read miss example, if the read request is for unique information, the server cache table 375 is updated and the storage object 370 is returned to the application 315a-d and asynchronously written to flash cache 330. However, advantageously, if the read request is for a storage object that points to a storage object currently in flash cache 330, the DSS 340 will return a status information 370, informing the flash cache driver 320 that the requested storage object can be found at a particular location in its flash cache 330.

For example, assume an application 315a previously issued a read request for storage object 350. After completion of the read request, the data associated with storage object 350 is stored in flash cache 330 as storage object 360. Next, the application 315b issues a read request for storage object 355b. Since the flash cache driver 320 does not know that object 355b is the same as object 360 in flash cache 330, the flash cache driver forwards the read request and flag 365 to the DSS 340. In this case, the DSS can determine, via previous snapshot replicas, that object 355b contains a pointer to object 350 and can also determine, via the server cache table 375, that object 350 currently resides in flash cache as object 360. As a result, rather than returning potentially large amounts of data, the DSS 340 can return a status indicator 370 (e.g., a 'get from cache' flag) indicating that the requested object is already in flash cache 330 the contents of which can be found in object 360.

The techniques described herein may further improve system performance by returning an extent around the storage object being requested when the object points to another object (e.g., objects 355a-c). The host flash cache driver 320 may optimize sequential access by checking list of known pointed to extents (i.e., identical extents) before sending a read request to the DSS 340. In this case, if it is a known copy (i.e., the DSS knows it contains a pointer) and the requested object in the other LUN is available in the flash cache 330, the object can be returned without communicating with the DSS 340.

In an alternative example embodiment, the technique may operate in a similar manner as that described with a modification wherein the array decides what data will be stored in the server's flash cache 330. When a read miss 365 is received at the DSS 340, the DSS 340 will return the requested storage object along with status information instructing the flash cache driver 320 whether or not to store (and/or evict) a storage object in the server's flash cache 330. The DSS 340 may still maintain the server cache table 375 and pointer-based replica information so as to be able to determine when an object is pointing to another copy object (i.e., a copy) as well as which objects reside in the server's flash cache 330. When a read request for data shared across LUNs is received, the DSS 340 may return a status indicating that the object is in server flash cache 330 (e.g., a 'get from cache' flag).

In another alternative example embodiment, the DSS may provide server cache table information and replica pointer information to the server's cache driver. In this scenario, the cache driver may maintain like objects in its cache as pointers 365a-c to complete copies of the like object 360 in a manner similar to that as described above with reference to the DSS.

Figure 4:
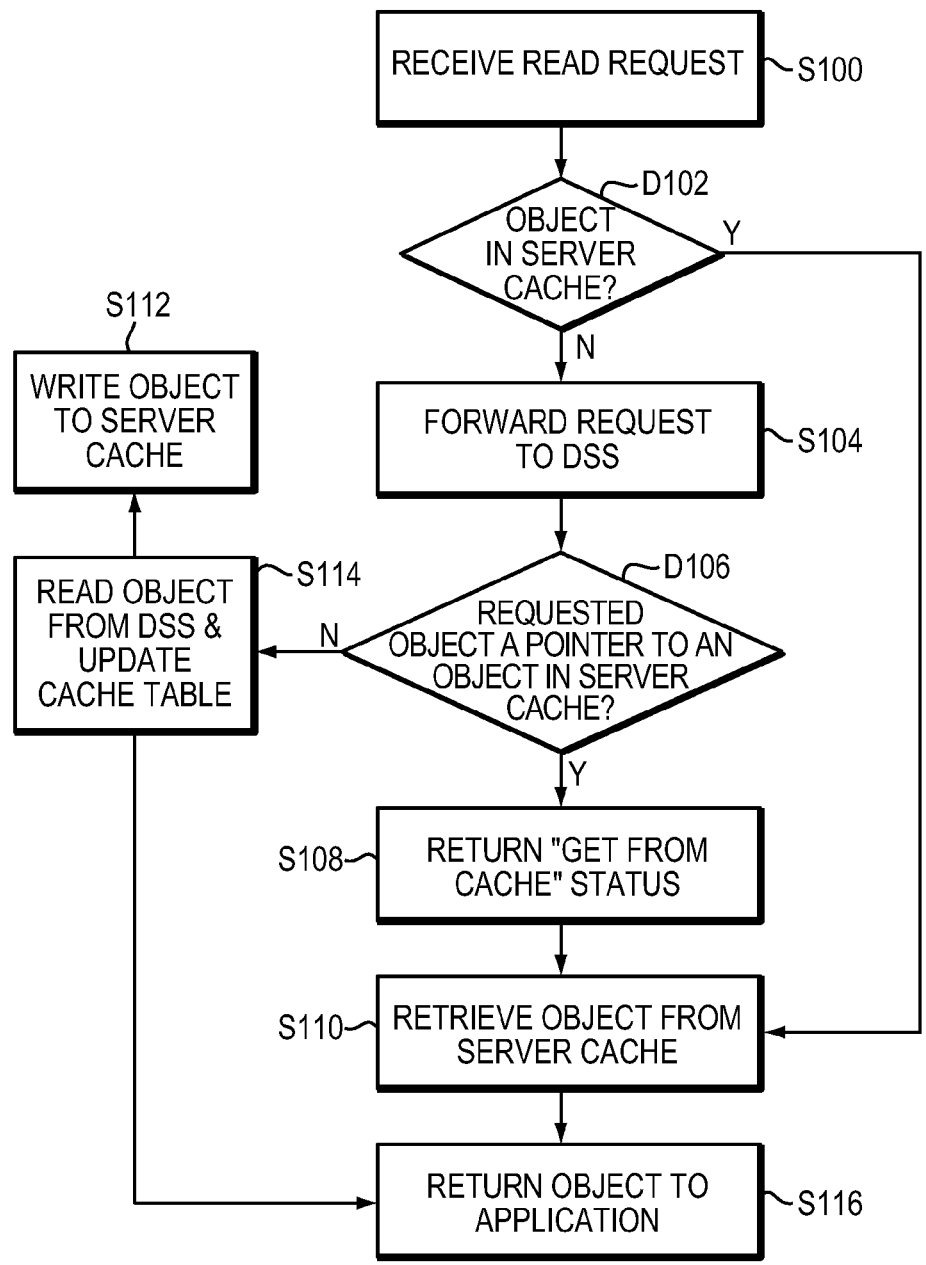
FIG. 4 is a flow diagram illustrating a process that may be used in connection with techniques described herein.

FIG. 4 is a flow diagram that illustrates an example method for use in managing storage operations in a server cache. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin at step S100 when a read request is generated by an application. The read request may be forwarded to a flash cache driver where the driver determines at step D102 whether the requested storage object is already stored in the server's flash cache. If the object is in server cache, the method retrieves the requested object from the server's cache at step S110 and proceeds to step S116 where the object is returned to the requestor (e.g., an application). If the object is not in server cache, the method proceeds to step S104 where the read request and flag are forwarded to the DSS.

At step D106, the DSS determines if the requested object contains a pointer to another object already stored in server cache. If so, the DSS returns a 'get from cache' status instructing the server cache to retrieve the contents of an object in its cache. At step S110, the method continues by retrieving the object from server cache and, at step S116, the object's contents are returned to the requestor (e.g., an application). If at step D106 the requested object is not a pointer to an object in server cache (e.g., a unique storage object), the method proceeds to step S114 where the requested object is read from the DSS, and if the cache driver indicated that the object is to be stored in server cache, the server cache table is updated to indicate such. The method then proceeds to return the requested object to the requestor (e.g., an application) at step S116 and also asynchronously (or synchronously) write the retrieved object to server cache at step S112.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing storage operations in a data storage environment, the method comprising:
   receiving an I/O request at a server having a server cache, the server cache containing cached data previously supplied from a storage system in communication with the server, wherein the cached data includes a first and second storage object, wherein the first and second storage objects are stored in memory spaces corresponding to different virtual machine clients and the second storage object is a pointer to the first storage object;
   providing logical storage space corresponding to each virtual machine client, wherein logical storage space associated with a second virtual machine is a pointer to logical space associated with a first virtual machine;
   at the storage system, determining that data associated with the I/O request is data that has been replicated and that the I/O request can be at least partially satisfied from the cached data;
   determining that the data associated with the I/O request is a pointer to non-replicated data;
   returning the pointer to the server cache; and
   storing the pointer in the server cache such that the I/O request can be satisfied by the server cache.

2. The method of claim 1, further including instructing the server to add a flag to the I/O request.

3. The method of claim 2, wherein the flag indicates that the data associated with the I/O request is being stored in the server cache.

4. The method of claim 1, further including: evicting data associated with the I/O request from the server cache; and sending an indicator to the storage system indicating that the data has been evicted.

5. The method of claim 1, further including instructing the storage system to send an indicator to the server indicating that the data associated with the I/O request is to be stored in the server cache.

6. The method of claim 1, further including identify, at the storage system, data to be stored in the server cache and data to be evicted from the server cache.

7. The method of claim 1, wherein the information indicative of a location where the replicated data object is stored is a pointer to a location storing contents of the data object.

8. The method of claim 1, wherein data associated with the I/O request is stored according to at least one of a file, object, or block access protocol.

9. The method of claim 1, wherein the I/O operation is a read request.

10. The method of claim 1, wherein the server is a virtual server and the data storage system is a virtual data storage system.

11. A system for use in managing storage operations in a data storage environment, the system comprising:
    first logic configured to receive an I/O request at a server having a server cache, the server cache containing cached data previously supplied from a storage system in communication with the server, wherein the cached data includes first and second storage objects, wherein the first and second storage objects are stored in memory spaces corresponding to different virtual machine clients and the second storage object is a pointer to the first storage object;
    second logic configured to provide logical storage space corresponding to each virtual machine client, wherein logical storage space associated with a second virtual machine is a pointer to logical space associated with a first virtual machine and determine, at the storage system, that data associated with the I/O request is data that has been replicated and that the I/O request can be at least partially satisfied from the cached data, wherein the second logic is further configured to determine that the data associated with the I/O request is a pointer to non-replicated data;
    third logic configured to return the pointer to the server cache; and
    fourth logic configured to store the pointer in the server cache such that the I/O request can be satisfied by the server cache.

12. The system of claim 11, wherein the first logic is further configured to instruct the server to add a flag to the I/O request.

13. The system of claim 12, wherein the flag indicates that the data associated with the I/O request is to be stored in the server cache.

14. The system of claim 11, wherein the first logic is further configured to: evict data associated with the I/O request from the server cache; and send, an indicator to the storage system indicating that the data has been evicted.

15. The system of claim 11, wherein the second logic is further configured to send an indicator to the server indicating that the data associated with the I/O request is to be stored in the server cache.

16. The system of claim 11, further including fifth logic configured to identify data to be stored in the server cache and data to be evicted from the server cache.

17. The system of claim 11, wherein the information indicative of a location where the replicated data object is stored is a pointer to a location storing contents of the data object.

18. The system of claim 11, wherein data associated with the I/O request is stored according to at least one of a file, object, or block access protocol.

19. The system of claim 11, wherein the I/O operation is a read request.

20. The system of claim 11, wherein the server is a virtual server and the data storage system is a virtual data storage system.

* * * * *